United States Patent
Pierce, Jr. et al.

(10) Patent No.: US 12,166,776 B1
(45) Date of Patent: Dec. 10, 2024

(54) MIDDLE-WARE ARTIFICIAL INTELLIGENCE (AI) ENGINE

(71) Applicant: Netskope, Inc., Santa Clara, CA (US)

(72) Inventors: Stevan W. Pierce, Jr., Camas, WA (US); Damian Charles Chung, Gilbert, AZ (US); Robert Wayne Butler, II, Rockport, IL (US); Madhura Sridhar, Hillsboro, OR (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/429,175

(22) Filed: Jan. 31, 2024

(51) Int. Cl.
  *H04L 29/06* (2006.01)
  *G06N 3/0455* (2023.01)
  *H04L 9/40* (2022.01)

(52) U.S. Cl.
  CPC ....... *H04L 63/1416* (2013.01); *G06N 3/0455* (2023.01); *H04L 63/029* (2013.01); *H04L 63/1425* (2013.01)

(58) Field of Classification Search
  None
  See application file for complete search history.

(56) References Cited

U.S. PATENT DOCUMENTS

| | | | |
|---|---|---|---|
| 5,440,723 A | 8/1995 | Arnold et al. | |
| 6,513,122 B1 | 1/2003 | Magdych et al. | |
| 6,622,248 B1 | 9/2003 | Hirai | |
| 7,080,408 B1 | 7/2006 | Pak et al. | |
| 7,298,864 B2 | 11/2007 | Jones | |
| 7,376,719 B1 | 5/2008 | Shafer et al. | |
| 7,735,116 B1 | 6/2010 | Gauvin | |
| 7,966,654 B2 | 6/2011 | Crawford | |
| 8,000,329 B2 | 8/2011 | Fendick et al. | |

(Continued)

FOREIGN PATENT DOCUMENTS

| | | |
|---|---|---|
| EP | 1063833 A2 | 12/2000 |
| WO | 2022182919 A1 | 9/2022 |

(Continued)

OTHER PUBLICATIONS

US 11,979,416 B2, 05/2024, Subramanya (withdrawn)*

(Continued)

*Primary Examiner* — Jeremiah L Avery
(74) *Attorney, Agent, or Firm* — MUGHAL GAUDRY & FRANKLIN PC

(57) ABSTRACT

A system uses an artificial intelligence (AI) engine to generate a response for end-user devices using services and to provide threat protection in a cloud-based network. The system consists of tenants, tunnels, the AI engine, and an AI reporter. A tenant includes the end-user devices. The tunnels transmit and segregate traffic between the end-user devices and the services. The AI engine intercepts traffic within tunnels, receives a request from a user, and determines a context. The AI engine further retrieves a user score for policy violations, analyzes the request, and applies functions to manage it. The context is built by analyzing interactions of users for similar requests. The AI engine generates the response based on the context and the user score and sends it to the user to fulfill the request. The AI reporter transmits information corresponding to the request and response across the tenants of the cloud-based network.

20 Claims, 11 Drawing Sheets

(56) References Cited

U.S. PATENT DOCUMENTS

| | | | |
|---|---|---|---|
| 8,296,178 | B2 | 10/2012 | Hudis et al. |
| 8,793,151 | B2 | 7/2014 | DelZoppo et al. |
| 8,839,417 | B1 | 9/2014 | Jordan |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,483,742 | B1 | 11/2016 | Ahmed |
| 9,811,662 | B2 | 11/2017 | Sharpe et al. |
| 10,084,825 | B1 | 9/2018 | Xu |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,476,907 | B2 | 11/2019 | Hittel et al. |
| 10,484,334 | B1 | 11/2019 | Lee et al. |
| 10,652,254 | B2 | 5/2020 | Kuperman et al. |
| 10,805,352 | B2 | 10/2020 | Ithal et al. |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,222,112 | B1 | 1/2022 | Satpathy et al. |
| 11,281,775 | B2 | 3/2022 | Burdett et al. |
| 11,336,689 | B1 | 5/2022 | Miramirkhani et al. |
| 11,424,993 | B1* | 8/2022 | Chaoji ............... H04L 41/5009 |
| 11,438,377 | B1 | 9/2022 | Azarafrooz et al. |
| 11,444,951 | B1 | 9/2022 | Patil et al. |
| 11,494,686 | B1* | 11/2022 | Mandayam Comar ................... G06N 20/00 |
| 11,677,788 | B1 | 6/2023 | Badana et al. |
| 11,743,298 | B1 | 8/2023 | Badana et al. |
| 11,868,479 | B2* | 1/2024 | Lysecky ............... G06F 21/566 |
| 11,995,205 | B2* | 5/2024 | Levy ................... H04L 63/083 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-LeMair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0052607 | A1 | 2/2015 | Al Hamami |
| 2015/0100357 | A1 | 4/2015 | Seese et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2020/0028771 | A1* | 1/2020 | Wong ................... H04L 43/067 |
| 2020/0050686 | A1 | 2/2020 | Kamalapuram et al. |
| 2020/0213336 | A1 | 7/2020 | Yu et al. |
| 2020/0012785 | A1 | 10/2020 | Dykes |
| 2021/0279565 | A1 | 9/2021 | Akella et al. |
| 2023/0208810 | A1 | 6/2023 | Dhanasekar et al. |
| 2023/0216892 | A1 | 7/2023 | Robinson et al. |
| 2023/0283629 | A1 | 9/2023 | Boyer et al. |
| 2023/0336575 | A1* | 10/2023 | Ackerman ........... H04L 63/1425 |
| 2023/0336591 | A1* | 10/2023 | Jones ...................... H04L 63/10 |
| 2023/0370495 | A1* | 11/2023 | Desai ................... H04L 63/1425 |
| 2023/0379350 | A1* | 11/2023 | Barton ................. H04L 63/1416 |
| 2023/0379356 | A1* | 11/2023 | Busany ................ H04L 63/1425 |
| 2023/0412631 | A1* | 12/2023 | Revankar ............. H04L 63/1408 |
| 2024/0039954 | A1* | 2/2024 | Shete ................... H04L 63/1425 |
| 2024/0048569 | A1* | 2/2024 | Shah .................... H04L 63/1416 |
| 2024/0056458 | A1* | 2/2024 | Lee ............................ G06F 40/58 |
| 2024/0059302 | A1* | 2/2024 | Yaghoubi ............... B60W 50/06 |
| 2024/0073237 | A1* | 2/2024 | Herszfang ............... G06F 18/22 |
| 2024/0080329 | A1* | 3/2024 | Reed ...................... H04L 67/306 |
| 2024/0104336 | A1* | 3/2024 | Irving ...................... G06N 3/092 |
| 2024/0106846 | A1* | 3/2024 | Kapoor ................... H04L 63/10 |
| 2024/0129338 | A1* | 4/2024 | Azad ..................... H04L 63/1491 |
| 2024/0154981 | A1* | 5/2024 | Wala ..................... H04L 63/1425 |
| 2024/0163312 | A1* | 5/2024 | Azad ......................... H04L 63/20 |
| 2024/0171614 | A1* | 5/2024 | Crabtree .................. H04L 63/20 |

FOREIGN PATENT DOCUMENTS

| | | |
|---|---|---|
| WO | 2022246131 A1 | 11/2022 |
| WO | 2022246263 A1 | 11/2022 |

OTHER PUBLICATIONS

Computer Desktop Encyclopedia definition of "processor": http://lookup.computerlanguage.com/host_app/search?cid=C999999&term=processor&lookup.x=0&lookup.y=0 (Year: 2014).*

Hajizadeh, Mehrdad et al. Probability Analysis of Successful Cyber Attacks in SDN-based Networks. 2018 IEEE Conference on Network Function Virtualization and Software Defined Networks (NFV-SDN). https://ieeexplore.ieee.org/stamp/stamp.jsp?tp=&arnumber=8725664&tag=1 (Year: 2018).*

Garg, Umang et al. Detection of DDoS Attacks using Semi-Supervised based Machine Learning Approaches. 2021 2nd International Conference on Computational Methods in Science & Technology (ICCMST). https://ieeexplore.ieeeorg/stamp/stamp.jsp?tp=&arnumber=9784741 (Year: 2021).*

Shi, Yi et al. Adversarial Machine Learning for Network Security. 2019 IEEE International Symposium on Technologies for Homeland Security (HST). https://ieeexplore.ieee.org/stamp/stamp.jsp?tp=&arnumber=9032936 (Year: 2019).*

I, Subasri et al. Machine Learning Based Feature Selection for DDOS Detection in Named Data Networking. 2022 4th International Conference on Advances in Computing, Communication Control and Networking (ICAC3N). https://ieeexplore.ieee.org/stamp/stamp.jsp?tp=&arnumber=10074206 (Year: 2022).*

Martin, Victoria, "Cooperative Security Fabric," The Fortinet Cookbook, Jun. 8, 2016, 6 pgs., archived Jul. 28, 2016 at https://web.archive.org/web/20160728170025/http://cookbook.fo rti net.com/cooperative-security-fa bric-54.

Huckaby, Jeff, Ending Clear Text Protocols,' Rackaid.com, Dec. 9, 2008, 3 pgs, accessed Oct. 17, 2024 at https://www.rackaid.com/blog/secure-your-email-and-file-transfers/.

Nevvton, Harry, "Fabric," Newton's Telecom Dictionary, 30th Updated, Expanded, Anniversary Edition, 2016, 3 pgs., United Book Press, New York, NY.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinetsecurity-fabric-named-2016-crn-network-security-product.

McCullagh, Declan, "How safe is instant messaging? A security and privacy survey," CNET, Jun. 9, 2008, 14 pgs.

(56) References Cited

OTHER PUBLICATIONS

Beck et al. "IBM and Cisco: Together for a World Class Data Center," IBM Redbooks, Jul. 2013, 654 pgs.
Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.
Zetter, Kim, "Revealed: The Internet's Biggest Security Hole," Wired, Aug. 26, 2008, 13 pgs.
Adya et al., 'Farsite: Federated, available, and reliable storage for an incompletely trusted environment, SIGOPS Oper. Syst. Rev. 36, SI, Dec. 2002, pp. 1-14.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," ACM SIGCOMM Computer Communication Review, 34(4), 2004, pp. 343-352.
Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://vvvvvv.zoho.com/mail/glossary/email-protocols.html#t~text=mode of communication.—, What are the different email protocols%3F, and also has defined functions.
Niit, Special Edition Using Storage Area Networks, Que, 2002, 6 pgs.
Chapple, Mike, "Firewall redundancy: Deployment scenarios and benefits," Tech Target, 2005, 5 pgs. available at https://wwww.techtarget.com/searchsecurity/tip/Firewall-redundancy-Deployment-scenarios-and-benefits?Offer=abt_pubpro_Al-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4Administration_Guide.pdf.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs. May 1999.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs May 13, 2018.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

* cited by examiner

700

702 {
- I. Acquisition:
  - Acquisition Channel Distribution:
    - direct: 2 users, search engine: 1 user, casb app: 1 user, fat app: 1 user 704 {
- II. Engagement:
  - Average Engagement Time: 132 seconds
  - Engaged Sessions per User: 1.7 sessions
  - Average Engagement Time per Session: 35 seconds
  - Users in Last 30 Minutes: 3 users
  - Views and Event Count: 5
  - Event Count by Event Name:
    - click_button: 2, view_product: 1, scroll_page: 1, submit_form: 1
  - Views by Page Title:
    - Home: 1, Product Page: 2, About Us: 1, Contact Us: 1

706 {
- III. Retention:
  - New Users: 5 users
  - Returning Users: 2 users
  - User Retention by Cohort:
    - Cohort 2024-01: 4 users
    - Cohort 2024-02: 2 users
  - User Engagement by Cohort:
    - Cohort 2024-01: 37.5 seconds
    - Cohort 2024-02: 30 seconds
  - User Retention: 0.4
  - User Engagement: 31.5 seconds
  - Lifetime Value: 157 seconds 708 {
- IV. User Overview:
  - Demographics:
    - User 1: direct, User 2: search engine, User 3: casb app, User 4: direct, User 5: fat app
  - Tech Overview:
    - User 1: direct, User 2: search engine, User 3: casb app, User 4: direct, User 5: fat app

FIG. 7

MIDDLE-WARE ARTIFICIAL INTELLIGENCE (AI) ENGINE

BACKGROUND

This disclosure relates, in general, to communication processing systems and, not by way of limitation, to the classification of intents received in natural language queries, among other things.

Computers are complex machines that allow individuals to receive the benefit of significant computational processing power. However, even with sophisticated software, computers merely perform the functions they are specifically programmed to do and generally do not account for user differences when performing such functions. The computer is generally ignorant of the user's needs. For example, when a user performs a search for information via a computer, the quality of the search, and thus, the quality of the search result will be confined explicitly to what the search system is programmed to return and to the terms provided by the user.

Traditional computer systems face limitations in efficiently responding to user queries primarily due to their reliance on predefined algorithms. These algorithms are rigidly programmed and lack the adaptability entailed to understand natural language, context, and the nuances present in diverse user inputs. As a result, users often encounter challenges in obtaining relevant information or assistance, especially when their queries deviate from the system's predefined rules.

SUMMARY

In one embodiment, the present disclosure provides a system that uses an artificial intelligence (AI) engine to construct a response for end-user devices using services and to provide threat protection in a cloud-based network. The system consists of tenants, tunnels, the AI engine, and an AI reporter. A tenant includes the end-user devices. The tunnels transmit and segregate traffic between the end-user devices and the services. The AI engine intercepts traffic within tunnels, receives a request from a user, and determines a context. The AI engine further retrieves a user score for policy violations, analyzes the request, and applies functions to manage it. The context is built by analyzing interactions of users for similar requests. The AI engine constructs the response based on the context and the user score and sends it to the user to fulfill the request. The AI reporter transmits information corresponding to the request and response across the tenants of the cloud-based network.

In an embodiment, a system that uses an artificial intelligence (AI) engine to construct a response for end-user devices using services and to provide threat protection in a cloud-based network. The system consists of tenants, tunnels, the AI engine, and an AI reporter. A tenant includes the end-user devices. The tunnels transmit and segregate traffic between the end-user devices and the services. The AI engine intercepts traffic within the tunnels at an application layer of the cloud-based network, receives a request from a user of an end-user device, and determines a context of the request. The context is built by analyzing interactions of users for similar requests. The AI engine while building the context determines writing styles, writing tones, toxicity, sentiment, bias, banned topics, and subtopics used by the user in the request and finds related events and components from a database within the cloud-based network. The AI engine further retrieves a score of the user for a likelihood that the request violates a policy, analyzes the request in accordance with the score of the user and the context, and applies functions to manage the request. Finally, the AI engine constructs the response of the request based on the context and the score and sends the response to the user of the end-user device to fulfil the request. The AI reporter transmits information corresponding to the request and response across the tenants of the cloud-based network.

In another embodiment, a method that uses an artificial intelligence (AI) engine for constructing a response for end-user devices using services and providing threat protection in a cloud-based network. The method includes intercepting traffic within the tunnels at an application layer of the cloud-based network, receiving a request from a user of an end-user device, and determining a context of the request. The context is built by analyzing interactions of users for similar requests. The AI engine while building the context determines writing styles, writing tones, toxicity, sentiment, bias, banned topics, and subtopics used by the user in the request and finds related events and components from a database within the cloud-based network. The method further includes retrieving a score of the user for a likelihood that the request violates a policy, analyzing the request in accordance with the score of the user and the context, and applying functions to manage the request. Finally, the AI engine constructs the response of the request based on the context and the score and sends the response to the user of the end-user device to fulfil the request. The method further includes transmitting information corresponding to the request and response across the tenants of the cloud-based network via an AI reporter.

In yet another embodiment, a computer-readable media is discussed having computer-executable instructions embodied thereon that when executed by one or more processors, facilitate, a method that uses an artificial intelligence (AI) engine for constructing a response for end-user devices using services and providing threat protection in a cloud-based network. The method includes intercepting traffic within the tunnels at an application layer of the cloud-based network, receiving a request from a user of an end-user device, and determining a context of the request. The context is built by analyzing interactions of users for similar requests. The AI engine while building the context determines writing styles, writing tones, toxicity, sentiment, bias, banned topics, and subtopics used by the user in the request and finds related events and components from a database within the cloud-based network. The method further includes retrieving a score of the user for a likelihood that the request violates a policy, analyzing the request in accordance with the score of the user and the context, and applying functions to manage the request. Finally, the AI engine constructs the response of the request based on the context and the score and sends the response to the user of the end-user device to fulfil the request. The method further includes transmitting information corresponding to the request and response across the tenants of the cloud-based network via an AI reporter.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 7 illustrates an exemplary web analysis report generated by the AI engine;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
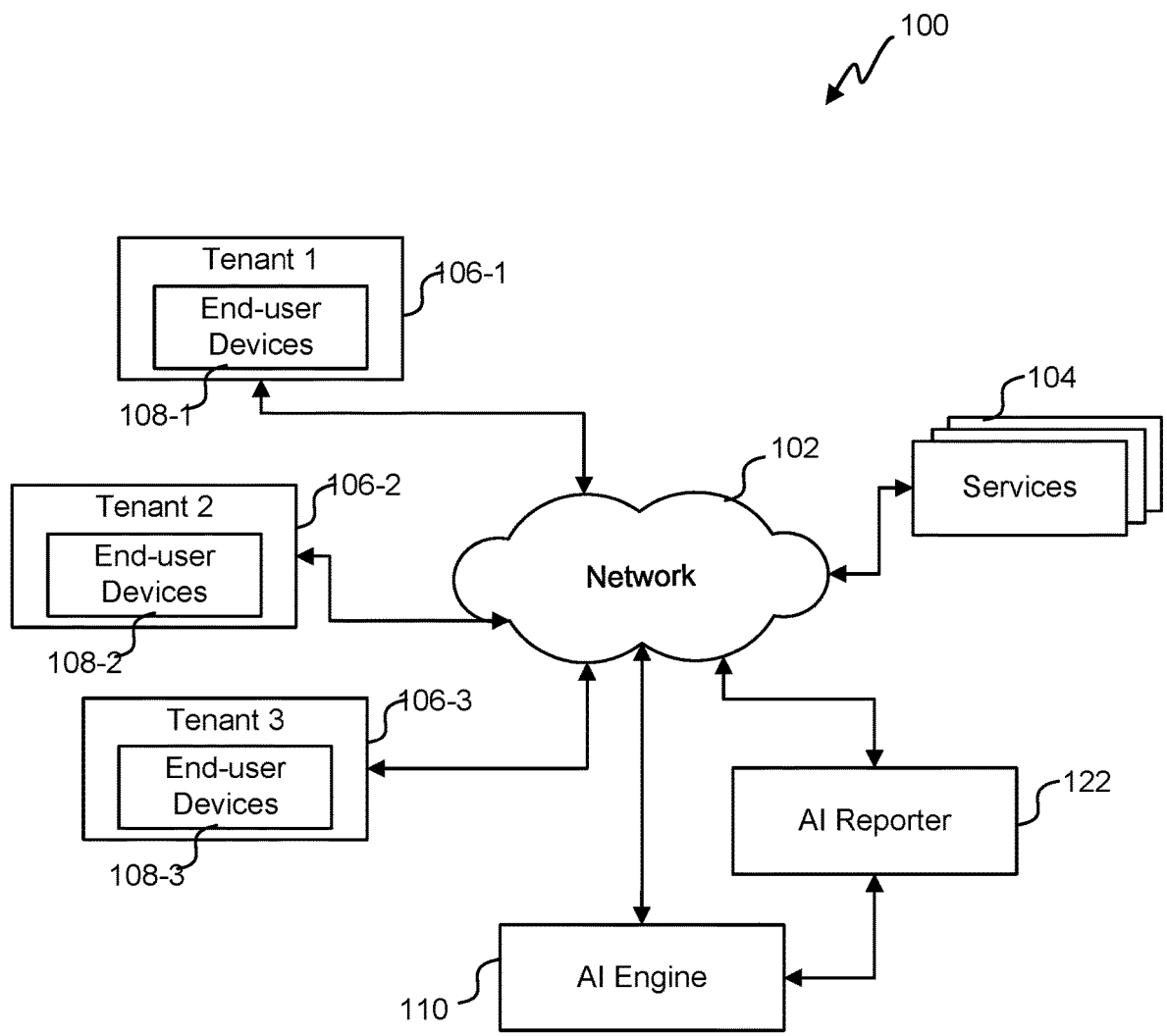
FIGS. 1A-1B illustrates a block diagram of an embodiment of a multi-tenant system with an artificial intelligence (AI) engine in a cloud-based network.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims Referring to FIG. 1A, a block diagram of an embodiment of a multi-tenant system 100 with an artificial intelligence (AI) engine 110 in a cloud-based network is shown. The multi-tenant system 100 handles security, quality of service compliance, service level agreement enforcement, service request metering, and other management activities relating to the tenants. The multi-tenant system 100 includes a network 102, services 104, tenants 106 (106-1, 106-2, 106-3), end-user devices 108 (108-1, 108-2, 108-3), the AI engine 110, and an AI reporter 122. The network 102 is any Internet network connecting the tenants 106, the AI engine 110, and the services 104. The services 104 are software solutions that are local applications, or software-as-a-service (SaaS) which are hosted and maintained by third-party vendors/cloud providers and provided to the end-user devices 108 over the network 102, such as the Internet. The services 104 can also be hosted within the data center of an enterprise. The end-user device 108 uses content and processing for content sites, for example, websites, streaming content, etc., and the services 104, for example, SaaS tools, databases, cloud service providers, etc. The terms "services" and "applications" are used interchangeably in this application.

The tenants 106 contain multiple end-user devices 108 that access the services 104. The end-user devices 108, including a cloud application or subscription that is owned or accessible to the user and other physical devices, such as smartphones, tablets, personal computers (PCs), and many other computers, communicate with the services 104 using the network 102. The end-user devices 108 runs on any popular operating system (OS) such as Windows™, iOS™, Android™, Linux, set-top box OSes, and Chromebook™. The AI engine 110 uses AI to scan the content of web and SaaS applications, contextualization of interactions (web and non-web), protections against malicious uniform resource locators (URLs) or files, moderate AI communications, and uses input and output channels to communicate with other components within the cloud security stack.

The AI engine 110 uses complex mechanisms to scan web, SaaS, infrastructure-as-a-service (IaaS), and other forms of traffic to provide access control, data loss prevention (DLP), and threat protections in an ever-changing landscape. The AI engine 110 (redundant) shines when it comes to contextualizing user actions as they relate to all of the above access methods, directly or indirectly. The AI engine 110 uses the concepts and ideas of a search engine optimization (SEO) platform to determine dwell time, page interactions, and referral mechanisms to aid in contextualization and to determine how a user interacts with a website providing a subjective analysis in addition to the objective and transactional based mechanisms currently in use today. The AI engine 110 constructs the response based on the context and the user score and sends it to the user to fulfill the request of the user.

The AI reporter 122 creates a report on the activity of the AI engine 110 and provides network wide generative AI (Gen AI) reporting. The AI reporter 122 collects used data and provides insights into how the language model of the AI engine 110 is being used. Thus, helping enterprises make data-driven decisions. The AI reporter 122 also provides real-time monitoring and alerts the tenants 106 of the network 102 to detect and respond to malicious entities or unusual or harmful usage patterns.

Figure 1B:
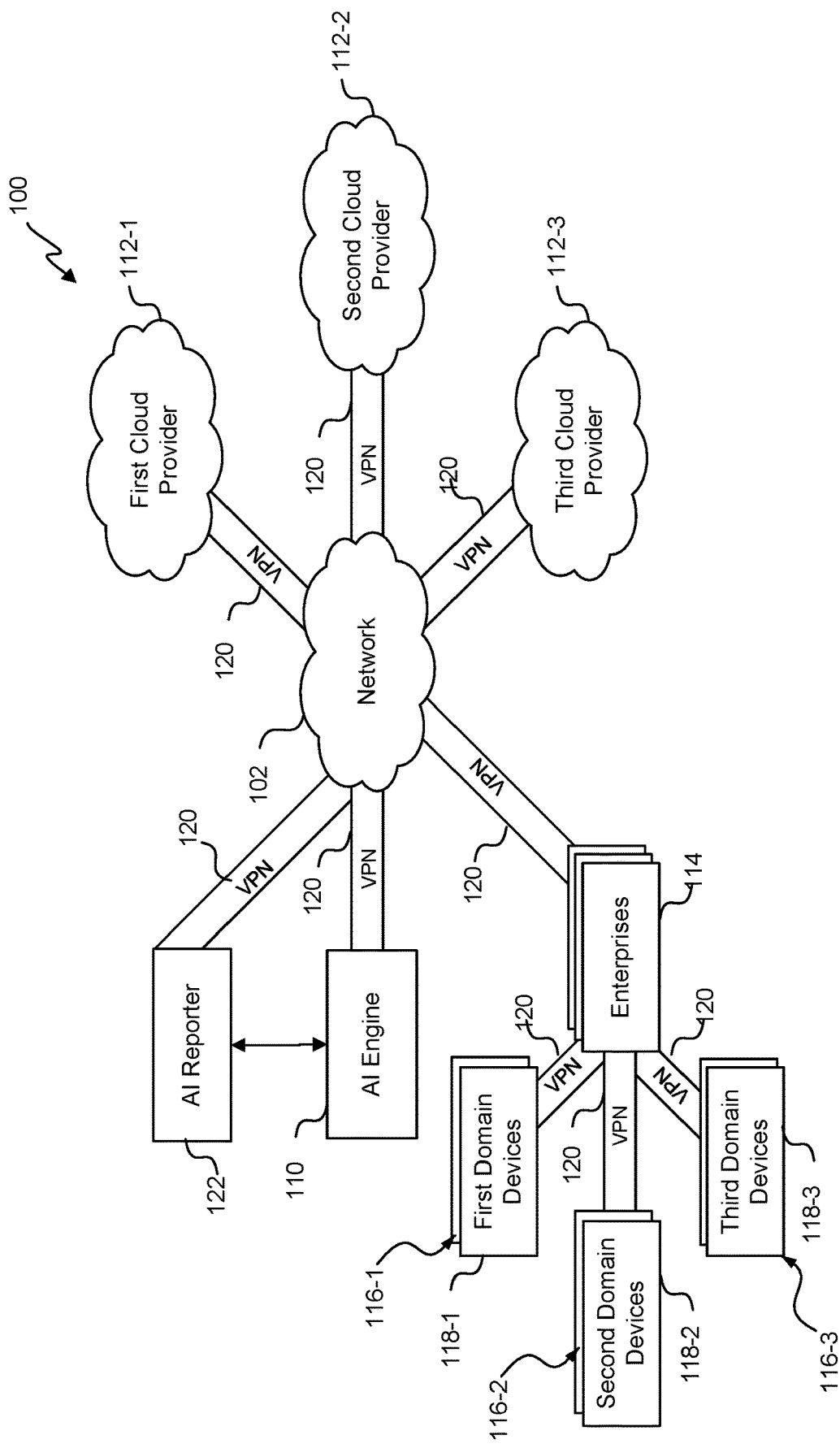

Referring to FIG. 1B, a block diagram of an embodiment of the multi-tenant system 100 is shown. The multi-tenant system 100 allows multiple tenants in different domains to communicate with various cloud providers over the network 102. The multi-tenant system 100 includes multiple servers. The multi-tenant system 100 allows multiple tenants/multi-tenant systems or enterprises 114 to use the same network separated by a domain or some other logical separation. Encryption, leased/encrypted tunnels, firewalls, and/or gateways can keep the data from one enterprise 114 separate from the other enterprise 114. The AI engine 110 assists with multi-tenancy control, policies, and data loss protection for individual domain data centers.

The multi-tenant system 100 may include a first computing environment 116-1 having end-user devices for a first domain 118-1, a second computing environment 116-2 having end-user devices for a second domain 118-2, and a third computing environment 116-3 having end-user devices for a third domain 118-3. Individual domain communicates with the enterprise 114 using a virtual private network (VPN) 120 over local area networks (LANs), wide area networks (WANs), and/or the network 102. Instead of the VPN 120 as an end-to-end path, tunneling (e.g., Internet Protocol in Internet Protocol (IP-in-IP), Generic Routing Encapsulation (GRE)), policy-based routing (PBR), Border Gateway Protocol (BGP)/Interior Gateway Protocol (IGP) route injection, or proxies could be used. Cloud providers 112 for offering remote services may include public or private clouds including Web/Software as a service (SaaS), and voice/video connected to the AI engine 110 via VPN 120.

Enterprises 114 are connected to the AI engine 110 using the VPN 120 over the network 102. Some examples of the cloud providers 112 include Amazon Web Services (AWS)®, Google Cloud Platform (GCP)®, and Microsoft Azure®. The applications provided by the cloud providers 112 include Office 365®, Box™, Zoom™, and Salesforce™ etc. The user subscribes to a set of services offered by the Cloud Application Providers. Some or all of the cloud providers 112 may be different from each other, for example, the first cloud provider 112-1 may run Amazon Web Services (AWS)®, the second cloud provider 112-2 may run Google Cloud Platform (GCP)®, and the third cloud provider 112-3 may run Microsoft Azure®. Although three cloud providers 112 are shown, any suitable number of cloud providers 112 may be provided that might be strictly captive to a particular enterprise or otherwise not accessible to multiple domains.

Each the cloud providers 112 may communicate with the network 102 using a secure connection. For example, the first cloud provider 112-1 may communicate with the network 102 via the VPN 120, the second cloud provider 112-2 may communicate with the network 102 via a different VPN, and the third cloud provider 112-3 may communicate with the network 102 via yet another VPN. Some embodiments could use leased connections or physically separated connections to segregate traffic. Although one VPN is shown, many VPNs exist to support different end-user devices, tenants, domains, etc.

Enterprises 114 may also communicate with the network 102 and the end-user devices 108 for their domain via VPNs 120. Some examples of the enterprises 114 may include corporations, educational facilities, governmental entities, and private consumers. Each enterprise may support multiple domains to logically separate its networks. The end-user devices 108 for each domain may include computers, tablets, servers, handhelds, and network infrastructure authorized to access the computing resources of their respective enterprises.

Further, the AI engine 110 may communicate with the network 102 via the VPN 120. Communication between the AI engine 110 and the cloud providers 112 (cloud application providers) for a given enterprise 114 can be either a VPN connection or tunnel depending on the preference of the enterprise 114. The AI engine 110 uses AI to scan web and SaaS applications, contextualize interactions, protect against malicious URLs or files, moderate AI communications, and communicate with other cloud security components. The AI engine 110 uses complex mechanisms to provide access control, DLP, and threat protection in an ever-changing landscape. The AI engine 110 contextualizes user actions, determining dwell time, page interactions, and referral mechanisms. The AI reporter 122 generates reports on the activities of the AI engine 110, providing network-wide generative AI reporting. It collects data, offers insights, and helps enterprises make data-driven decisions. The connection between the tenants 106 and the AI engine 110 is over an encrypted VPN 120 or tunnel.

Figure 2:
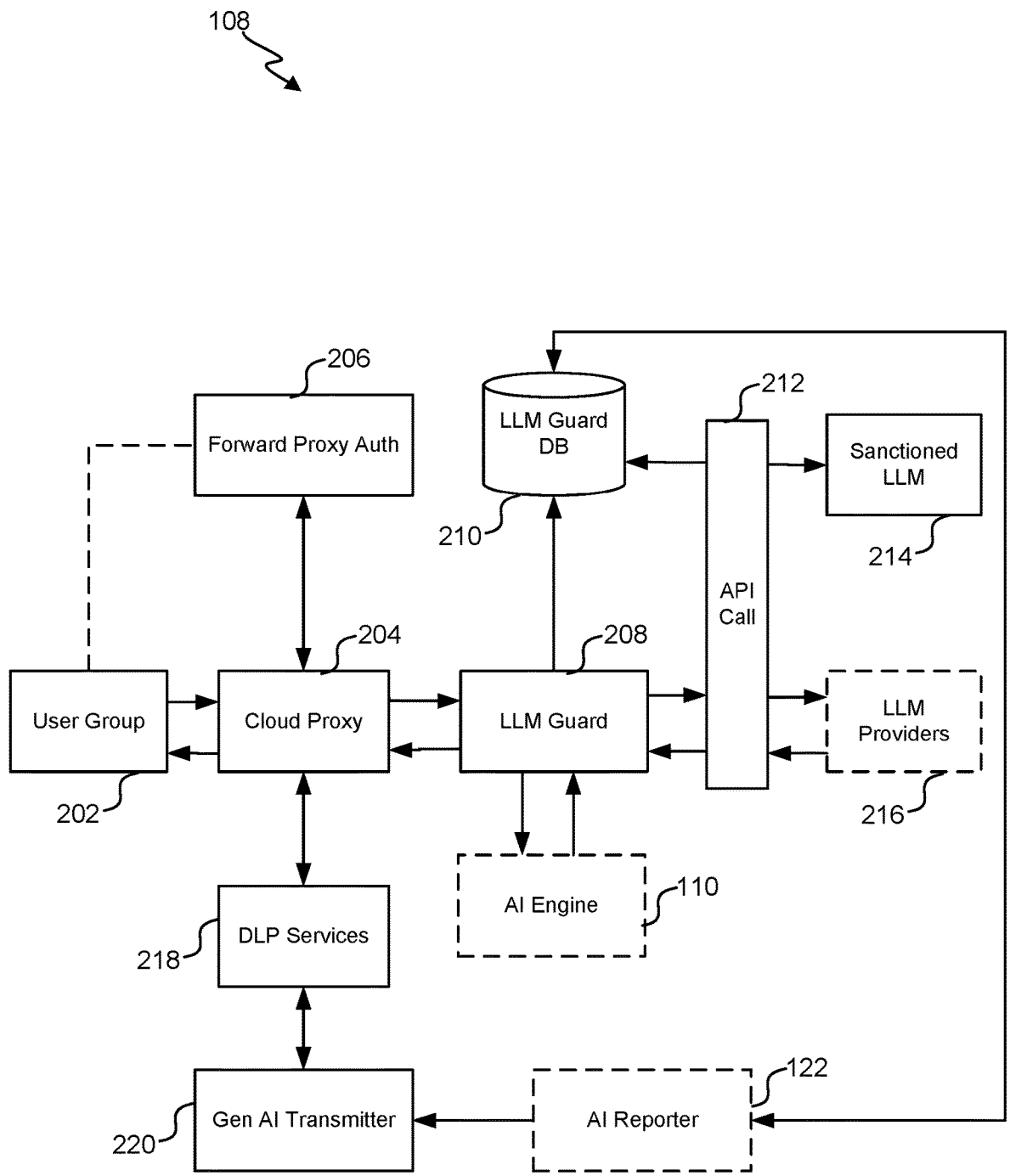
FIG. 2 illustrates a block diagram of an embodiment of an end-user device within a tenant.

Referring next to FIG. 2, a block diagram of an embodiment of the end-user device 108 within the tenant 106 is shown. The end-user device 108 is operating at the application layer of the cloud open systems interconnection (OSI) model. The end-user device 108 includes a user group 202, a cloud proxy 204, a forward proxy auth 206, a large language model (LLM) guard 208, and an LLM guard database (DB) 210. The end-user device 108 contains an application programming interface (API) call 212, a sanctioned LLM 214, DLP services 218, and a Gen AI transmitter 220. The components of the end-user device 108 can reside within or can be implemented as separate services on the network 102. The user group 202 contains information on the users that are accessing the services 104 through a particular end-user device and making requests.

The cloud proxy 204 is a cloud-based system between a user and a web server, SaaS application, or data center. The cloud proxy 204 is an intermediary between the user and the server, providing secure access to resources while protecting the server from malware and other threats. The cloud proxy 204 uses access control services (ACS) via forward proxy auth 206. The forward proxy auth 206 and the cloud proxy 204 provide authentication mechanisms to restrict access to authorized users or applications, enhancing security and privacy. The forward proxy auth 206, and the cloud proxy 204 scan the incoming requests from the user and forward them to the LLM guard 208. The LLM guard 208 acts as a significant intermediary, channeling requests to the LLM service and handling responses. The LLM guard 208 also performs cardinal post-processing, enhancing the utility and effectiveness of the LLM interactions for safe and responsible use.

In one embodiment, the LLM service that receives the request is the AI engine 110. In other embodiments, the LLM providers 216 receive the incoming requests. The LLM providers 216 are the services 104 available on the network 102. The LLM providers 216 include Anthropic™, Cohere™, Google®, Lightning AI™, Meta™, and MindsDB™, along with other similar providers. The requests from the LLM guard 208 are stored in the LLM guard DB 210. The LLM guard DB 210 also stores and transports the information regarding the requests and the responses to the AI reporter 122. The LLM guard 208 sends the request to the LLM providers 216 or the AI engine 110 via the API call 212. The API call 212 is used to enforce rate limits and throttling to ensure fair usage of the language model API. This prevents abuse, overloading, and excessive costs. The sanctioned LLM 214 is also used for almost the same purpose. The sanctioned LLM 214 provides access control, DLP, and threat protection between the AI engine 110 and the services 104 being accessed.

The DLP services 218 are configured with the cloud proxy 204 for monitoring access control, and with the Gen AI transmitter 220 for reporting malicious entity or unusual usage patterns. The DLP services 218 comply with policies of the tenant 106. The policies are user-specific and can be modified by the tenant 106 and/or the enterprise 114. The DLP services 218 determines whether a user has breached a policy. Then, based on this information the DLP services 218 calculates a risk score for that user and determines the level of threat imposed by the policy breach. The user with a risk score that crosses a pre-defined threshold represents the malicious entity. The score of the user is based on behavioral and historical analysis of user activity, thus allowing the AI engine 110 to pre-recognize the activities of a malicious entity. A depiction of the risk scores of a user and the level of threat posed based on the policies of a tenant is given below in Table I:

TABLE I

Risk scores and level of threat posed based on policies of a tenant

| Policy no. | Policies of tenant 1 | Action | Policy breached | Risk score | Threat Level |
|---|---|---|---|---|---|
| 1 | Allow social media | Allow | No | 2 | Low |
| 2 | Prohibited sites | Block | Yes | 7 | High |
| 3 | File protection | Block | No | 0 | None |
| 4 | Restricted countries | Block | No | 1 | Low |
| 5 | Unsafe cloud storage | Block | Yes | 8 | High |

The DLP services 218 perform static and dynamic anti-virus inspection. Additionally, an entropy calculation is completed each time a new file edit gets saved. The DLP services 218 also determines the level of similarity between new and old values for file size, file name, file extension and other properties that represent file features. Malware scanning engines with sandbox analyzers execute files determined to be suspicious and therefore in need of a full threat scan, to test behavior. In one implementation, as much as five minutes may be used to execute each of the executables in the file after scanning. Also included in the DLP services 218 can be an alert generator for signaling that a file contains malware. One security service is a native service implemented by the security service provider. Third-party services include a security service app firewall that controls input, output, and access from, to, or by an application, by monitoring and potentially blocking the input, output, or system service calls that do not meet the configured security services policy.

An example of an app firewall is a web application firewall (WAF) for HTTP applications. Yet another security service or DLP service is intrusion prevention system (IPS) that monitors a tenant's network for malicious activity or policy violations, often using a security information and event management (SIEM) system to collect malicious activity and policy violations centrally. In the DLP services 218, user-by-user data and file-by-file security data are stored in a database or an in-memory data store cache. In one implementation, the user-by-user data and the file-by-file data are stored in a semi-structured data format like JSON, BSON (Binary JSON), XML, Protobuf, Avro, or Thrift object, which includes fields (or columns) and corresponding values of potentially different types like numbers, strings, arrays, and objects.

The Gen AI transmitter 220 gets information on the unusual activity of the user and sends it across the network 102 via the AI reporter 122. Gen AI is used to make the system flexible and adaptable, able to handle a wide variety of tasks without needing to be specifically programmed for each one.

Figure 3:
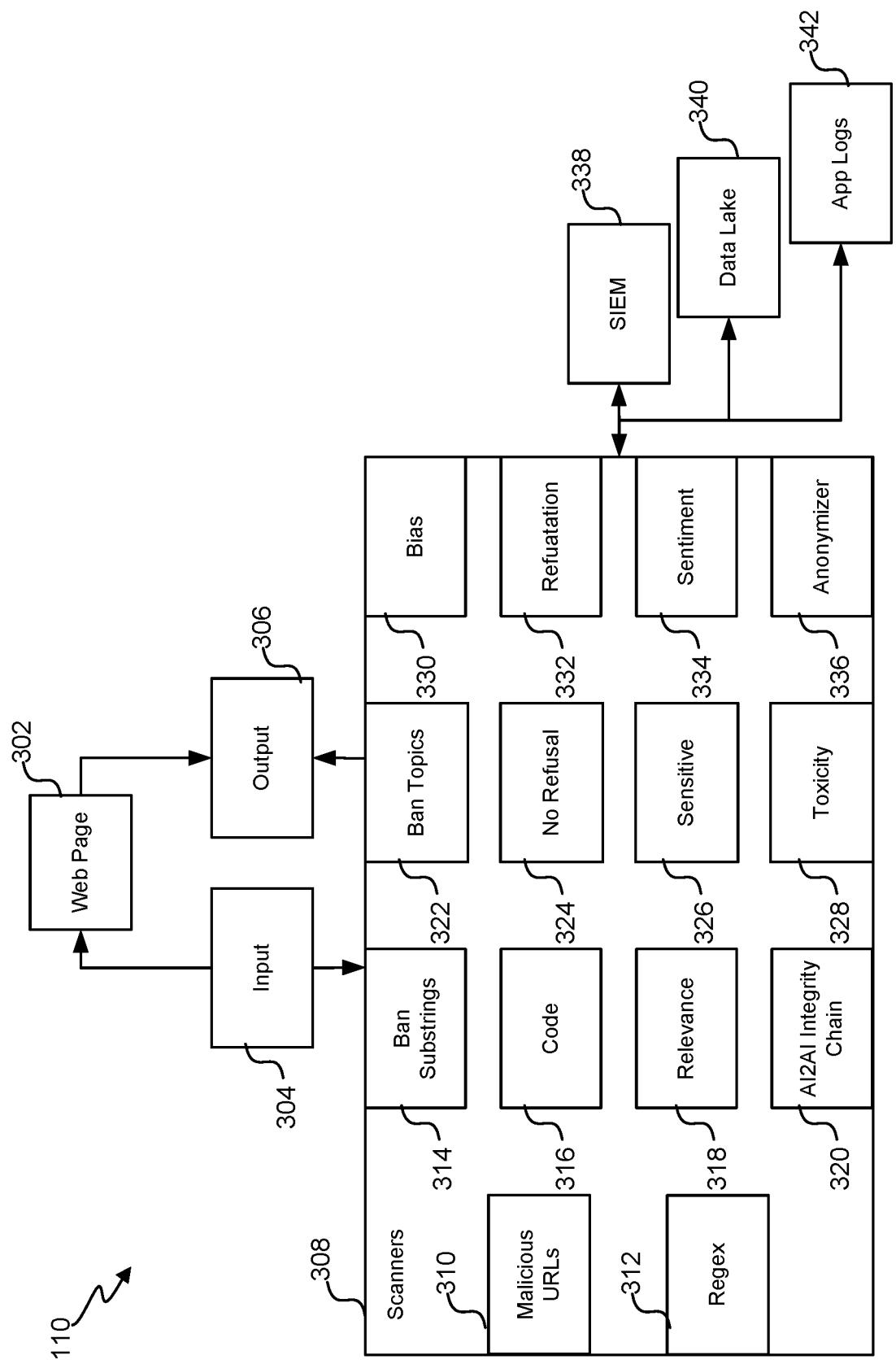
FIG. 3 illustrates a block diagram of an embodiment of the AI engine in a cloud-based network.

Referring next to FIG. 3, a block diagram of an embodiment of the AI engine 110 in the cloud-based network is shown. The AI engine 110 is used to intercept traffic in the tunnels, receive requests, and construct their responses for the user at the end-user device 108. The AI engine 110 provides web and SaaS applications or the service 104 scanning with contextualization and protection against malicious entities. The AI engine 110 builds context by determining how the user interacts with the service 104, providing a subjective as well as an objective analysis. The AI engine 110 further provides AI communication moderation, gating functionality, and reporting. The AI engine 110 consists of a web page 302, an input 304, an output 306, and scanners 308. The scanners 308 contains filters for malicious URLs 310, Regex 312, ban substrings 314, code 316, relevance 318, and AI2AI integrity chain 320. The AI2AI integrity chain 320 verifies the integrity of the enterprise 114 and ratings as well as AI app-to-AI app communications. The scanners 308 further include filters to scan data that contains ban topics 322, no refusal 324, sensitive 326, toxicity 328, bias 330, refutation 332, sentiment 334, and anonymizer 336. The AI engine 110 can also be configured with external services outside the cloud-based network such as SIEM 338, data lake 340, and App logs 342.

The AI engine 110 uses complex mechanisms to scan the web, SaaS, IaaS, and other forms of traffic to provide access control, DLP, and threat protections in an ever-changing landscape. The AI engine 110 shines when it comes to contextualizing user actions as they relate to all of the above access methods, directly or indirectly. It uses the concepts and ideas of an SEO platform to determine dwell time, page interactions, and referral mechanisms to aid in contextualization. It also determines how a user interacts with a website providing a subjective analysis in addition to the objective and transactional-based mechanisms currently in use today. When an interaction between a user and a web destination takes place, the AI engine 110 analyzes the interaction to determine the writing styles, writing tones, toxicity, sentiment, bias, and banned topics and subtopics that a writer may use in addition to analysis of context. When an interaction between a user and a non-web destination takes place, the AI engine 110 uses related events and components within the user logs of the cloud-based network.

For example, this can be used for determining if an individual at a school library is researching school shootings or would be a potential perpetrator of a school shooting. Additional context for this would be the analysis of social media accounts associated with a particular individual gathered through traffic originating from their users on the network 102 or other access methods, including but not limited to verification of compromised credentials of personal accounts. Other aspects of this would include analysis of writing to determine if writings are for research purposes, a listing of intended targets, or a manifesto.

The AI engine 110 provides a behavioral analysis of items and individual actions but allows for a historical analysis of similar interactions. This allows for precognition of activities and prohibits a potential threat action from acting maliciously, including malicious code injections and identification of vulnerabilities. The AI engine 110 ties in the DLP service 218, behavioral analysis, and contextualization to aid in distinguishing normal and abnormal flows then responds with the following actions:
  a passive response, i.e. alerting;
  a restraining response, i.e. isolation;
  a profiling response, i.e. analyzing predetermined response and its desirability;
  a diversionary response, i.e. directions to a sandboxed environment in which the above three actions occur; and,
  an adversarial response, i.e. actively attacking a perpetrator.

The AI engine 110 analyzes communications/interactions for AI over browser plugins, SaaS apps to SaaS apps, mobile applications, and desktop applications. These communications include user-to-application, application-to-application, and application-to-user. In addition, The AI engine 110 analyzes environments that do not necessarily have a user or API connection but are within an IaaS environment, i.e. docker containers. This allows the AI engine 110 to "see" the landscape and determine what is happening across it. The AI engine 110 also uses the risk scores of the users to make decisions on whether or not communications would be allowed and takes immediate action. This allows the AI engine 110 to make safe and educated decisions when allowing users to interact with AI systems or software, and permissions are granted for AI applications to interact with other AI applications. The AI engine 110 moderates the interactions by scaling up/down number of requests across the users and the services 104 within the cloud-based network.

The AI engine 110 provides enhanced features by using the functions. These functions are used by the LLM guard 208 and provide a list of features such as: API rate limiting and throttling, access control and authentication, data privacy and compliance, customization and configuration, error handling and logging, etc. The LLM guard 208 can enforce rate limits and throttling to ensure fair usage of the language model API. This prevents abuse, overloading, and excessive costs. API rate limiting and throttling by integrating with existing API connections to avoid a tragedy of the commons and a fair use of these resources, not just AI resources but all resources that are licensed by the customer. Feed it an API key and give it parameters of rates, and cost. It will help to keep the costs to a minimum and provide for current and future spending based on predictive analysis. The functions provide authentication mechanisms to restrict access to authorized users or applications, enhancing security and privacy.

The LLM guard 208 can be configured to scrub or filter sensitive information from input and output data to comply with data privacy regulations like GDPR. Instead of just blocking the connection or alerting, let's massage the data and present it "safely" or in a directed manner. This feature can also track what is being asked and sent back to the user. Then use this tracked info to provide responses back to the end user which saves a trip and cost to the sanctioned LLM 214 of the enterprise 114. Users can configure the LLM guard 208 to tailor the behavior of the language model according to their specific needs, such as fine-tuning for specific domains or tone of conversation. The input 304 and the output 306 can be checked for bias, sensitivity, toxicity, reputation, etc.

The request from the user at the input 304 is checked for its writing styles and tones. Writing styles include academic, analytical, anecdotal, argumentative, articulate, biographical, blog, casual, colloquial, comparative, concise, creative, descriptive, detailed, dialogue, direct, dramatic, emotional, evaluative, expository, fiction, historical, informative, journalistic, letter, lyrical, metaphorical, monologue, narrative, news, objective, pastoral, personal, persuasive, poetic, reflective, rhetorical, satirical, sensory, simple, technical, theoretical, and vivid. Writing tone means whether the request is assertive, authoritative, cheerful, conversational, factual, formal, friendly, humorous, informal, inspirational, neutral, nostalgic, polite, professional, romantic, sarcastic, sensitive, serious, sincere, skeptical, suspenseful, or sympathetic.

The AI engine 110 can use these functions to log API requests and responses for debugging and auditing purposes and handle errors gracefully to ensure a robust user experience. The LLM guard 208 helps distribute API requests to multiple language model instances, improving scalability and fault tolerance. The functions can filter out inappropriate or harmful content to ensure that the language model's output adheres to community guidelines and content policies.

The LLM guard 208 can modify or enhance responses generated by the model before they are returned to the user, such as formatting, summarization, or translation. This improves response times and massage output into a format that the AI engine 110 is able to analyze better. If the AI engine 110 knows what is coming back to it and formatting it, it would be easier to review for security. The LLM guard 208 can monitor and control usage to optimize costs, ensuring that users or applications stay within budget constraints. The AI engine 110 can handle language translation tasks, allowing users to interact with the language model in multiple languages, and translate responses accordingly. The LLM guard 208 enables fine-grained control over content generation, including setting guidelines for generating creative or informative content. The LLM guard 208 can cache frequently requested responses, reducing latency and improving the overall responsiveness of the API. The AI engine 110 can integrate with other services and APIs, enriching the capabilities of the language model by connecting it to data sources, databases, or external services outside of the cloud-based network.

The AI engine 110 provides usage analytics and insights on how data is being used, not just with LLM but with additional data sources that we connect to the AI engine 110 itself i.e., connecting the AI engine 110 to a large data repository, the data lake 340, the SIEM 338 solution, the app logs 342 streamed from other sources, etc. The AI engine 110 provides real-time monitoring and alerting capabilities to detect and respond to unusual or potentially harmful usage patterns.

In one embodiment, a user entity behavior analyzer (UEBA) can be connected to the AI engine 110. The UEBA uses machine learning models to look over all the interactions of a user with all SaaS applications and thus make a pattern of actions particular to each user in the network 102. The UEBA collects behavioral information from multiple sensors in the enterprise 114. The UEBA then processes this information according to the policies and generates behavioral intelligence and a baseline of user activity. Various commercially available products are used for this purpose. It allows the AI engine 110 to change settings and make predictions so that the enterprise 114 is no longer the one controlling the buttons and switches; the AI engine 110 will do the lifting for the enterprise 114.

The AI engine 110 provides LLM reporting inside the tenant 106 through advanced analytics and provides an LLM usage report across industries and customers. The AI engine 110 gives a customer an LLM report respective to their industry and allows the enterprise 114 to use that data for each of its customers to start making decisions. The AI engine 110 emulates an SEO engine by determining what led a user to arrive at a site or destination application. Is that a Web browser? Direct? Search engine? CASB app? or a Desktop app? The AI engine 110 looks at the engagement of the user for items such as: average engagement time, engaged sessions per user, average engagement time per session, users in the last 30 minutes, views and event count, event count by event name, views by page title and screen class, user activity over time, and user stickiness.

The AI engine 110 reviews user retention on sites based on: new users and returning users, user retention by cohort, user engagement by cohort, user retention, user engagement, and lifetime value. The AI engine 110 allows the enterprise 114 to provide a user overview of demographics such as: user attributes overview, audiences, demographic details, tech overview, and tech details.

Figure 4:
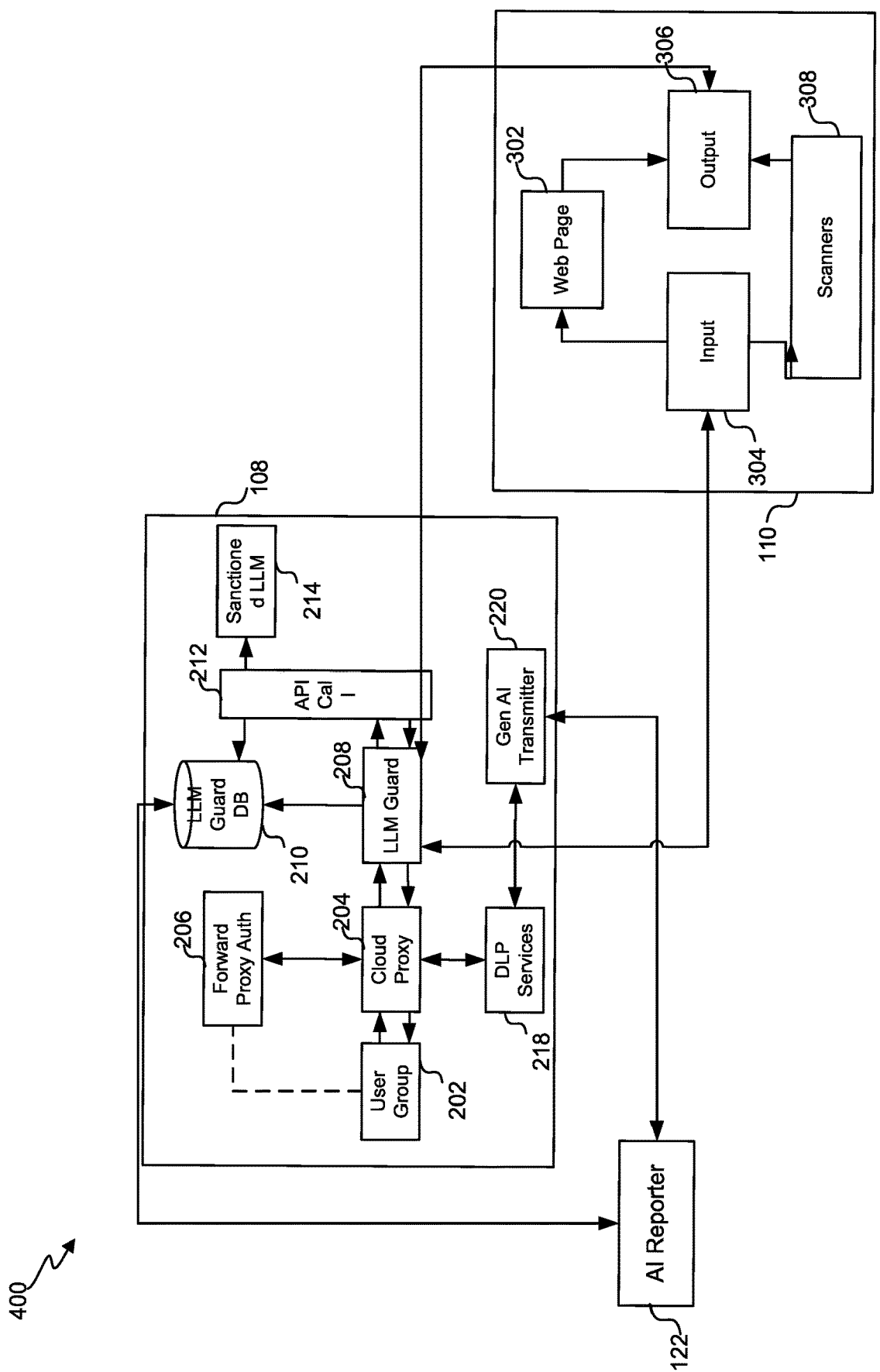
FIG. 4 illustrates a block diagram of an embodiment of the end-user device interacting with the AI engine and an AI reporter.

Referring next to FIG. 4, a block diagram 400 of an embodiment of the end-user device 108 interacting with the AI engine 110 and the AI reporter 122 is shown. The LLM guard 208 of the end-user device 108 acts as a significant intermediary, channeling requests to the AI engine 110 and handling responses. The LLM guard 208 also performs cardinal post-processing, enhancing the utility and effectiveness of the LLM interactions for safe and responsible use. The user of the end-user device 108 makes a request which is received at the input 304 of the AI engine 110. The AI engine 110 uses LLM, scanners 308, and functions of the LLM guard 208 and creates a response to the request. The response to the request can include code and pictures from the web among other information. For example, the AI engine 110 can include LinkedIn API comments, increase some verbiage around data flows of the AI engine, or incorporate items such as Google™ snippets in the response.

Upon making an initial request the user of the end-user device 108 gets a response from the AI engine. However, if a user sends a similar request, the AI engine 110 sends back an influenced response. All requests and their corresponding responses along with the context are saved in the LLM guard DB 210. So, if a user sends a similar request, the sanctioned LLM 214 analyzes the LLM guard DB 210 and sends the already generated response to the user.

In one embodiment, the user from the user group 202 at the end-user device 108 sends an initial request to the cloud proxy 204. The cloud proxy 204 uses ACS via forward proxy auth 206 for access control and authorization. The cloud proxy 204 forwards the request from the authorized user to the LLM guard 208. The LLM guard 208 stores the request of the user in the LLM guard DB 210. The LLM guard 208 sends the request to the AI engine 110 via the API call 212. The AI engine 110 uses the scanners 308 and the feedback from the DLP services 218 to create a response for the incoming request. The AI engine 110 then sends the response at the output 306 to the LLM guard 208 via the API call 212. The LLM guard 208 stores the response from the AI engine 110 in the LLM guard DB 210. The LLM guard 208 sends the response to the cloud proxy 204. Finally, the cloud proxy 204 sends the response back to the user.

In another embodiment, the user from the user group 202 at the end-user device 108 sends a similar request to the cloud proxy 204. The cloud proxy 204 uses ACS via forward proxy auth 206 for access control and authorization. The cloud proxy 204 forwards the request from the authorized user to the LLM guard 208. The LLM guard 208 stores the request of the user in the LLM guard DB 210. The sanctioned LLM 214 analyzes the LLM guard DB 210 for similar requests and flags the request. The stored response to the similar request is retrieved from the LLM guard DB 210. The LLM guard 208 sends the influenced response to the cloud proxy 204. Finally, the cloud proxy 204 sends the influenced response back to the user.

The Gen AI transmitter 220 gets information of any anomaly or malicious entity from the DLP services and sends it to the AI reporter 122. The AI reporter 122 retrieves the requests and responses of the flagged user from the LLM guard DB 210. The AI reporter 122 makes a detailed report and sends the AI related insights to the tenants 106 on the network 102. The AI engine 110 can also report the request flagged by the scanners 308. The AI engine 110 can respond to unusual data usage in several ways such as: a passive response, i.e. alerting, a restraining response, i.e. isolation, a profiling response, i.e. analyzing predetermined response and its desirability, a diversionary response, i.e. directions to a sandboxed environment in which the above three actions occur, and an adversarial response, i.e. actively attacking a perpetrator.

Figure 5:
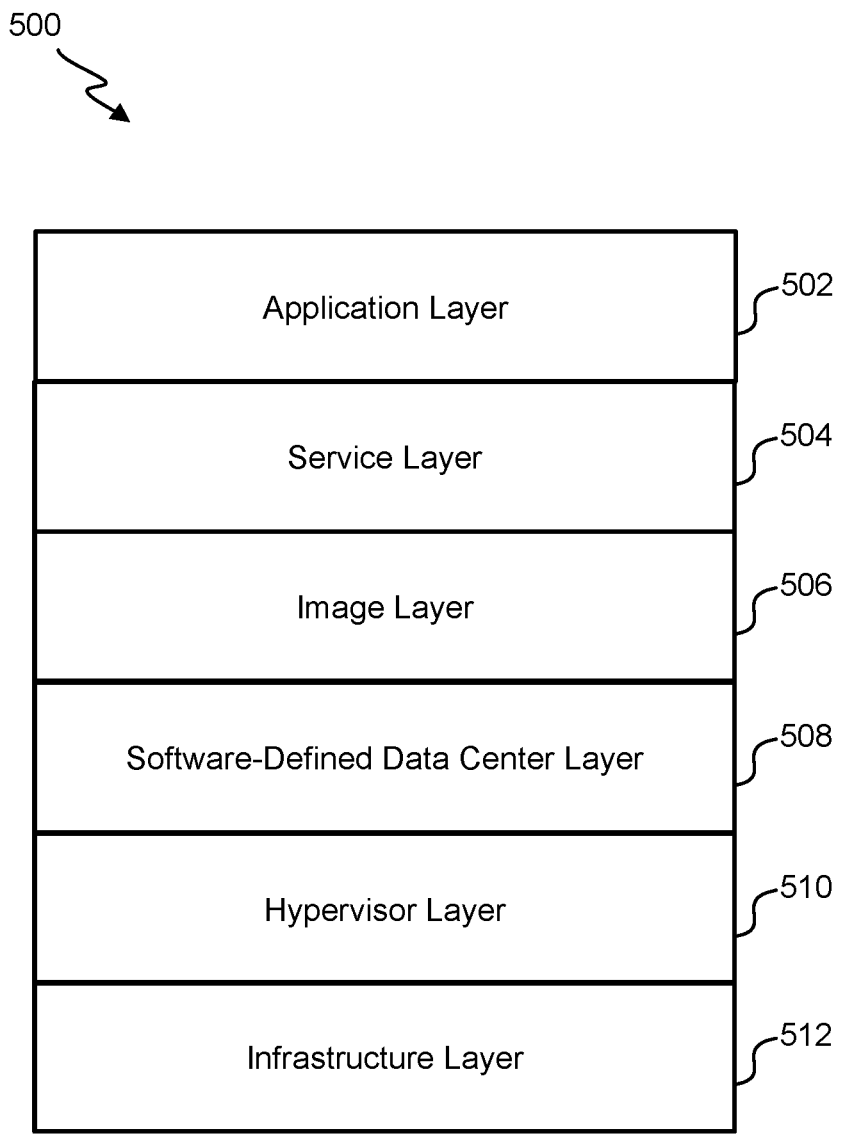
FIG. 5 illustrates a block diagram of an embodiment of a cloud open systems interconnection (OSI) model.

Referring next to FIG. 5, a block diagram of an embodiment of a cloud OSI model 500 is shown. The cloud OSI model 500 for cloud computing environments partitions the flow of data in a communication system into six layers of abstraction. The cloud OSI model 500 for cloud computing environments can include, in order: the application layer 502, a service layer 504, an image layer 506, a software-defined data center layer 508, a hypervisor layer 510, and an infrastructure layer 512. The respective layer serves a class of functionality to the layer above it and is served by the layer below it. Classes of functionality can be realized in software by various communication protocols.

The infrastructure layer 512 can include hardware, such as physical devices in a data center, that provides the foundation for the rest of the layers. The infrastructure layer 512 can transmit and receive unstructured raw data between a device and a physical transmission medium. For example, the infrastructure layer 512 can convert the digital bits into electrical, radio, or optical signals.

The hypervisor layer 510 can perform virtualization, which can permit the physical devices to be divided into virtual machines that can be bin-packed onto physical machines for greater efficiency. The hypervisor layer 510 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 508 can provide resource pooling, usage tracking, and governance on top of the hypervisor layer 510. The software-defined data center layer 508 can enable the creation of virtualization for the Infrastructure-as-Code concept by using representational state transfer (REST) APIs. The management of block storage devices can be virtualized, and users can be provided with a self-service API to request and consume those resources which do not entail any knowledge of where the storage is deployed or on what type of device. Various compute nodes can be balanced for storage.

The image layer 506 can use various operating systems and other pre-installed software components. Patch management can be used to identify, acquire, install, and verify patches for products and systems. Patches can be used to rectify security and functionality problems in software. Patches can also be used to add new features to operating systems, including security capabilities. The image layer 506 can focus on the computing in place of storage and networking. The instances within the cloud computing environments can be provided at the image layer 506.

The service layer 504 can provide middleware, such as functional components that applications use in tiers. In some examples, the middleware components can include databases, load balancers, web servers, message queues, email services, or other notification methods. The middleware components can be defined at the service layer 504 on top of specific images from the image layer 506. Different cloud computing environment providers can have different middleware components. The application layer 502 can interact with software applications that implement a communicating component. The application layer 502 is the layer that is closest to the user. Functions of the application layer 502 can include identifying communication partners, determining resource availability, and synchronizing communications. Applications within the application layer 502 can include custom code that makes use of middleware defined in the service layer 504.

Various features discussed above can be performed at multiple layers of the cloud OSI model 500 for cloud computing environments. For example, translating the general policies into specific policies for different cloud computing environments can be performed at the service layer 504 and the software-defined data center layer 508. Various scripts can be updated across the service layer 504, the image layer 506, and the software-defined data center layer 508. Further, APIs and policies can operate at the software-defined data center layer 508 and the hypervisor layer 510.

Different cloud computing environments can have different service layers 504, image layers 506, software-defined data center layers 508, hypervisor layers 510, and infrastructure layers 512. Further, respective cloud computing environments can have the application layer 502 that can make calls to the specific policies in the service layer 504 and the software-defined data center layer 508. The application layer 502 can have noticeably the same format and operation for respective different cloud computing environments. Accordingly, developers for the application layer 502 ought not to understand the peculiarities of how respective cloud computing environments operate in the other layers.

Figure 6:
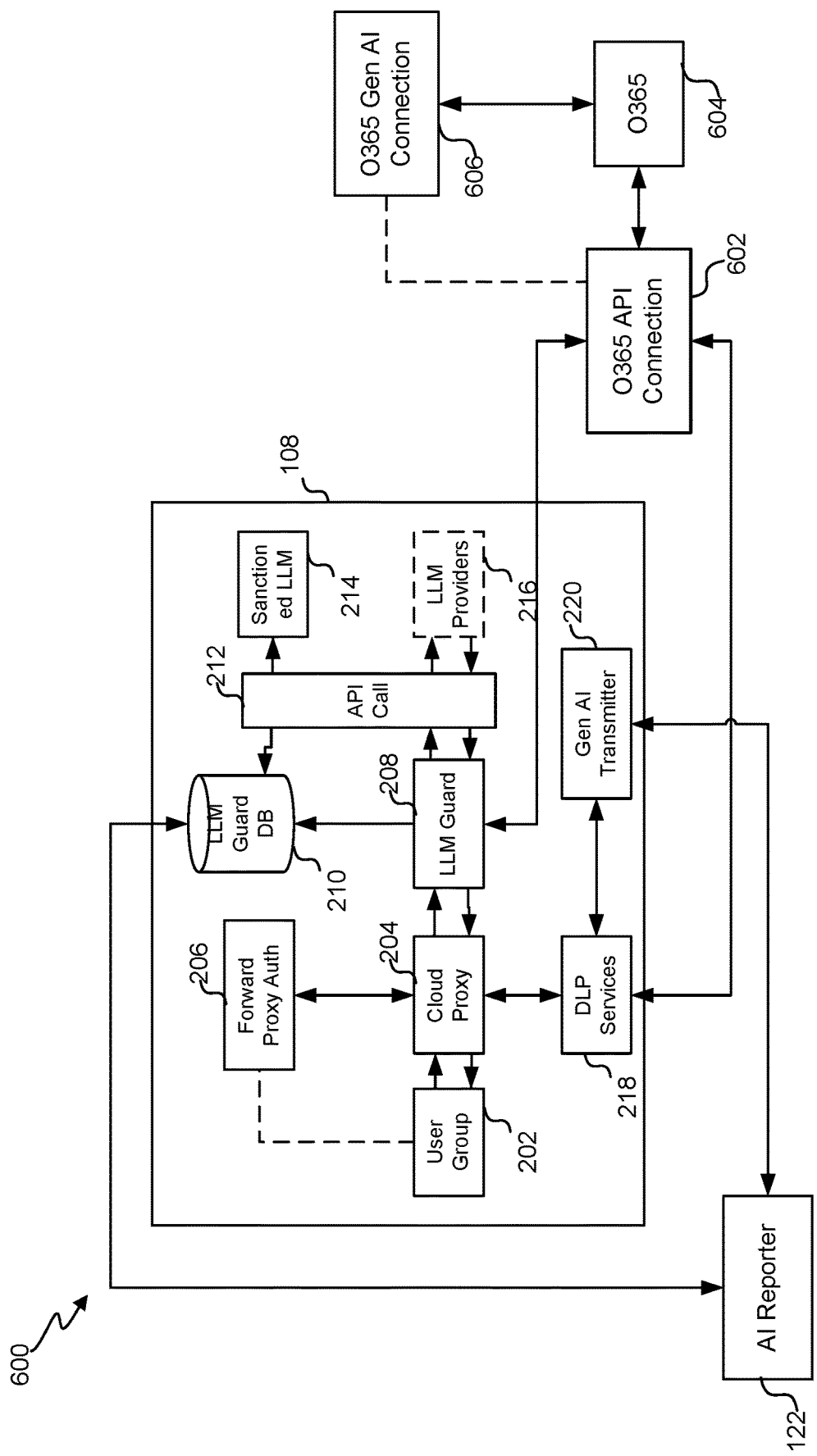
FIG. 6 illustrates a block diagram of an embodiment of the end-user device accessing content from a service.

Referring next to FIG. 6, a block diagram of an embodiment of the end-user device 108 accessing content 600 from the service 104 is shown. The service 104 accessed by the user at the end-user device 108 is an Office 365 (O365) 604 service. The end-user device 108 is interacting with the O365 604 via an O365 API connection 602 and an O365 Gen AI connection 606. The O365 API connection 602 allows the O365 604 to interact in a common language. Web APIs allow businesses to access 3rd-party data and seamlessly integrate it anywhere and anytime it's required, offering unmatched data processing efficiencies and cost savings. The O365 API connection 602 reads the O365 604 objects i.e., API and SaaS security posture management (SSPM). The O365 API connection 602 reads and moderates the data sent to the O365 Gen AI connection 606. The O365 API connection 602 requests data to the LLM guard 208. The O365 604 responds to the data sent to the O365 API connection 602 for moderation with the O365 Gen AI connection 606. The O365 API connection 602 is also configured with the DLP services 218 to provide access control, data loss prevention, and threat protection between the O365 604 and the O365 Gen AI connection 606 applications.

Referring next to FIG. 7, a web analysis report 700 generated by the AI engine 110 is shown. The AI engine 110 analyzes the web page 302 to generate the web analysis report 700 which can be used by the enterprise 114 to see the activity of its users. In section 702, the web analysis report 700 shows the acquisition, i.e., how did the user arrive at this site? Did the user sign into the application directly, or did it use the search engine? Acquisition information regarding each application can be seen in section 702.

In section 704, the information related to the engagement of the users on the web page is given. The engagement information relates to insights such as: average engagement time of the user, engaged sessions per user, average engagement time per session, users in the last 30 minutes, views and event count, event count by event name, views by page title, screen class user activity over time, and user stickiness.

In section 706, the retention rate or user stickiness to an application or web page can be seen. The retention information in section 706 includes the number of new users and returning users, user retention by cohort (a cohort is a collection of users who are grouped by some criteria, i.e. the day the user was acquired or area of the world from which they originated), user engagement by cohort, user retention, user engagement, and lifetime value.

In section 708, a simple user overview of demographics for the web analysis is shown. This user overview includes details such as: user attributes, overview audiences, demographic details, tech overview, and tech details. All these insights from the web analysis report 700 can be used by the AI engine 110 to make educated and safe decisions by keeping a pattern of user's usual activity in sight. The enterprises 114 also use the web analysis report 700 to check the activity of its employees or customers.

Figure 8:
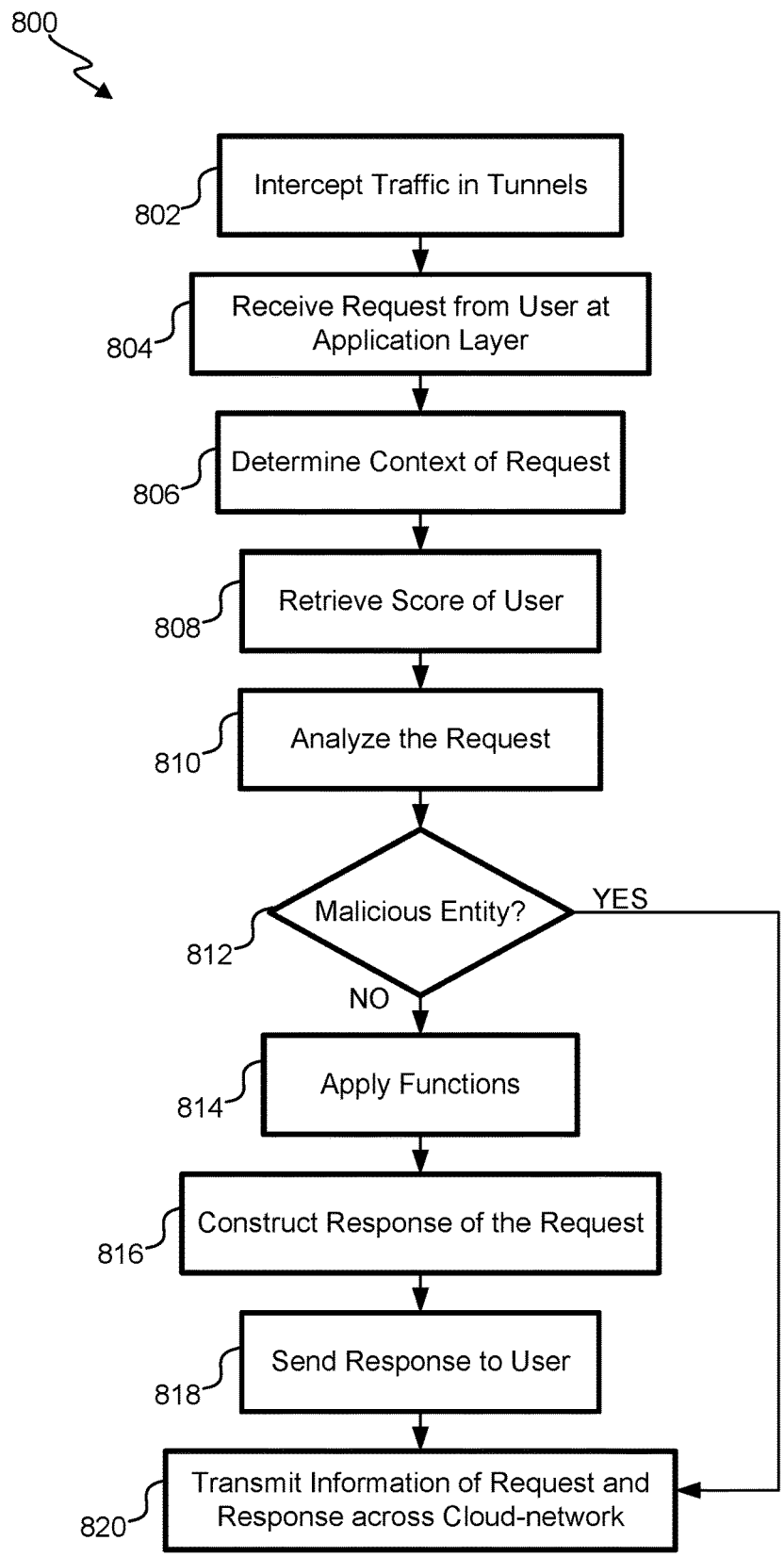
FIG. 8 illustrates a flowchart of the working mechanism of the AI engine as a man-in-the-middle at an application layer of the cloud OSI model.

Referring next to FIG. 8, a flowchart of working mechanism 800 of the AI engine 110 as a man-in-the-middle at the application layer 502 of the cloud OSI model 500 is shown. The AI engine 110 uses AI to scan the content of the services i.e., web and SaaS applications. It provides contextualization of interactions (web and non-web), protection against malicious URLs or files, moderate AI communications. Input and output tunnels are used by AI engine 110 to communicate with other components within the cloud OSI model 500.

At block 802, the AI engine intercepts the tunnels at the application layer 502 of the cloud-based network and routes the traffic within the tunnels towards itself. The tunnels i.e., VPN 120, transmit and segregate traffic for different users in the cloud-based network. In this way, the AI engine 110 acts as the man-in-the-middle in the interactions of the end-user device 108 with the service 104.

At block 804, the AI engine 110 receives request from the user at the end-user device 108. The request is sent at the input 304 of the AI engine 110 via the API call 212. The LLM guard 208 can send the request to the AI engine 110 or the LLM providers 216. The request is first authenticated at the cloud proxy 204 according to the policies and then forwarded to the AI engine 110.

At block 806, the AI engine 110 determines the context of the request. The context of the request determines the writing style, tone, and the environment to see the nature of the request. The context is built by analyzing interactions of the plurality of users for similar requests.

At block 806, the AI engine 110 retrieves the score of the user from the DLP services 218 to determine a likelihood that the request violates a policy of a plurality of policies. In light of the context and the score of the user, the AI engine 110 analyzes the request at block 810.

At block 812, the AI engine 110 determines whether a malicious entity is identified or not. A malicious entity is described as unusual data usage such that the score of the user has crossed a pre-defined threshold. If the scanners 308 of the AI engine 110 detect any bias, relevance, toxicity, or other such things in the request then it is flagged, and the information of the malicious entity is sent across the tenants 106 of the cloud-based network at block 820.

Otherwise, if no malicious entity is detected, then functions are applied at block 814. These functions are actually the gating functions of the LLM guard 208. The functions moderate and regulate the number of requests and are also used to tailor the behavior of the language model according to their specific needs, such as fine-tuning for specific domains or tone of conversation.

At block 816, the AI engine 110 constructs a response of the request. The AI engine 110 makes sure that standard regulations are followed, and the response provides a safe and educated reply to the request. At block 818, the response is sent back to the user. The output 306 of the AI engine 110 sends the response to the LLM guard 208, which sends it back to the cloud proxy 204 and then to the user.

At block 820, the insights of the requests and their corresponding responses are transmitted to the tenants 106 of the cloud-based network. This allows better security measures against any security attack in the future and allows the enterprises 114 to better understand the information trends etc. of its customers.

Figure 9:
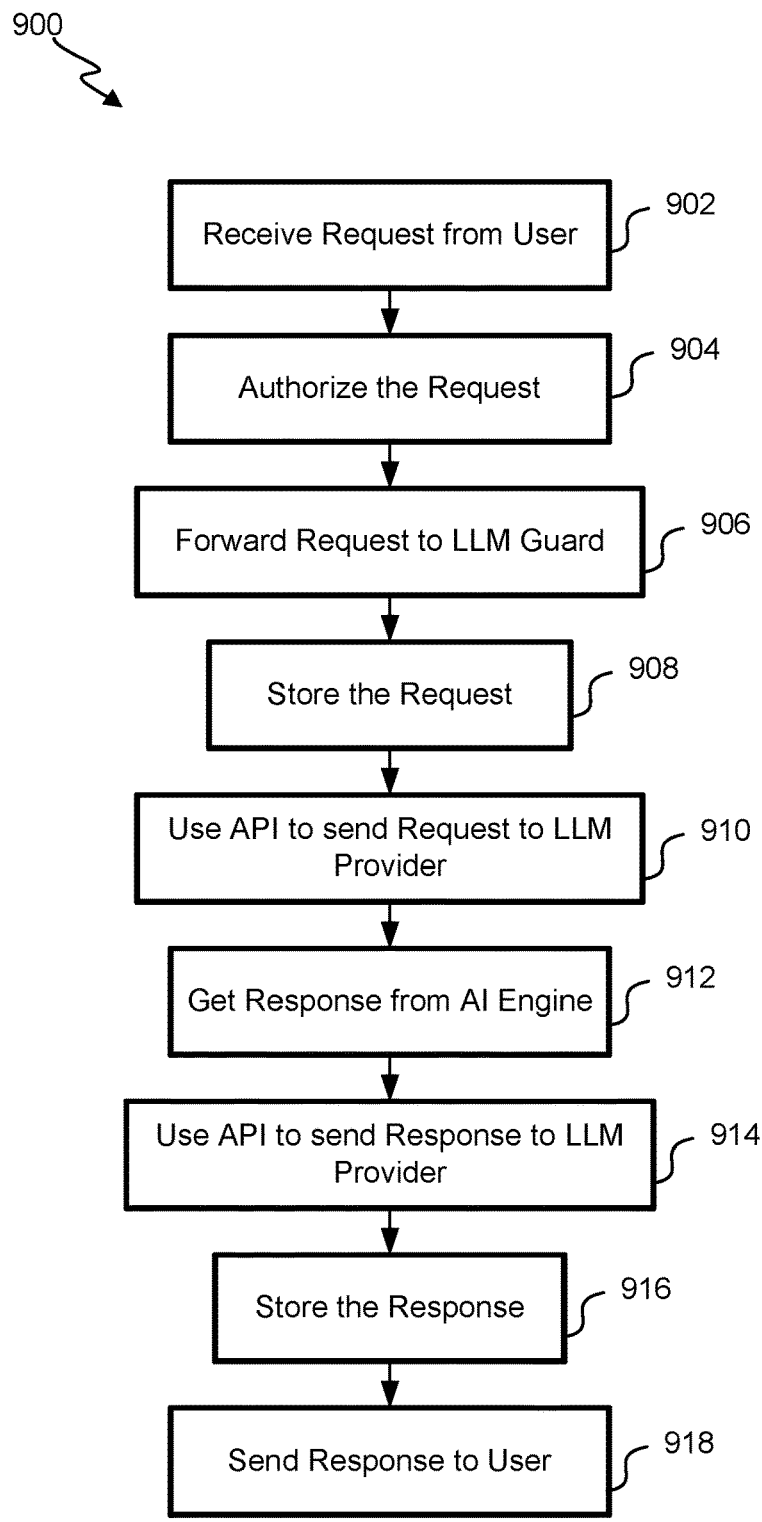
FIG. 9 illustrates a flowchart of a process of handling an initial request of the user.

Referring next to FIG. 9, a flowchart of a process of handling an initial request 900 of the user is shown. At block 902, the initial request is received at the cloud proxy 204 by the user from the user group 202 at the end-user device 108. At block 904, the cloud proxy 204 uses ACS via forward proxy auth 206 for access control and authorization. At block 906, the cloud proxy 204 forwards the request from the authorized user to the LLM guard 208.

At block 908, the LLM guard 208 stores the request of the user in the LLM guard DB 210. At block 910, the LLM guard 208 sends the request to the AI engine 110 via the API call 212. At block 912, a response to the initial request is received from the AI engine 110. The AI engine 110 uses the scanners 308 and the feedback from the DLP services 218 to create a response for the incoming request.

At block 914, the AI engine 110 then sends the response at the output 306 to the LLM guard 208 via the API call 212. At block 916, the LLM guard 208 stores the response from the AI engine 110 in the LLM guard DB 210. The LLM guard 208 sends the response to the cloud proxy 204. Finally at block 918, the cloud proxy 204 sends the response back to the user.

Figure 10:
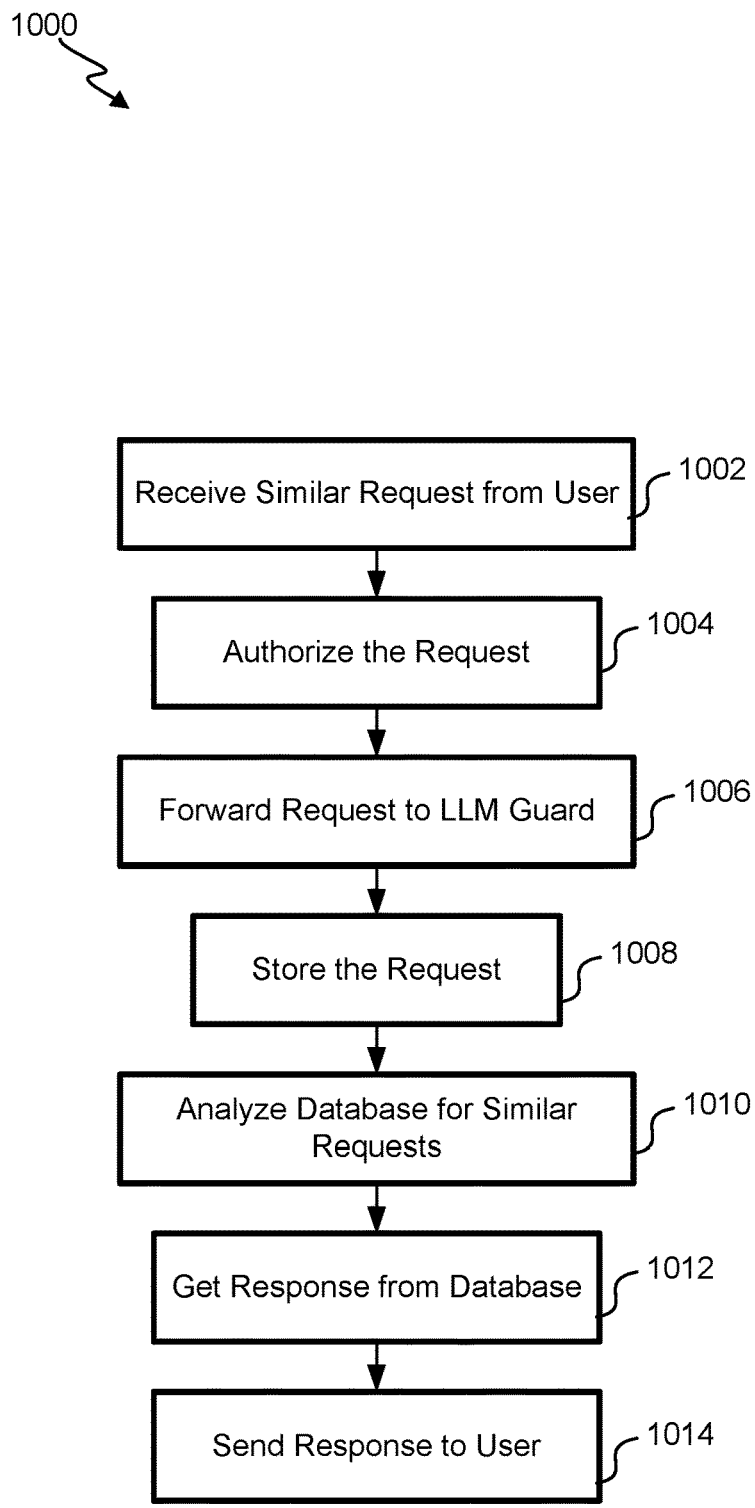
FIG. 10 illustrates a flowchart of a process of handling a similar request of the user to get an influenced response.

Referring next to FIG. 10, a flowchart of handling a similar request 1000 of the user to get an influenced response is shown. At block 1002, the initial request is received at the cloud proxy 204 by the user from the user group 202 at the end-user device 108. At block 1004, the cloud proxy 204 uses ACS via forward proxy auth 206 for access control and authorization. At block 1006, the cloud proxy 204 forwards the request from the authorized user to the LLM guard 208.

At block 1008, the LLM guard 208 stores the request of the user in the LLM guard DB 210. At block 1010, the sanctioned LLM 214 analyzes the LLM guard DB 210 for similar requests and flags the request. At block 1012, the stored response to the similar request is retrieved from the LLM guard DB 210. The LLM guard 208 sends the influenced response to the cloud proxy 204. Finally at block 1014, the cloud proxy 204 sends the influenced response back to the user.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process that is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

We claim:

1. A system to generate a response (Reverse Antecedent/Fixed) using an artificial intelligence (AI) engine for a plurality of end-user devices using a plurality of services and to provide threat protection in a cloud-based network comprises:
    a tenant of a plurality of tenants in the cloud-based network, the tenant includes the plurality of end-user devices;
    a plurality of tunnels between the plurality of end-user devices and the plurality of services, wherein the plurality of tunnels is operable to transmit and segregate traffic;
    the AI engine is operable to:
        intercept traffic within the plurality of tunnels at an application layer of the cloud-based network;
        receive a request from a user of a plurality of users of an end-user device of the plurality of end-user devices;
        determine a context of the request, wherein the context is built by analyzing interactions of the plurality of users for similar requests;
        retrieve a score of the user for a likelihood that the request violates a policy of a plurality of policies;
        analyze the request from the user based on the score of the user and the context of the request;
        apply a plurality of functions to manage the request;
        generate the response to the request based on the context and the score;
        send the response to the user of the plurality of users of the end-user device of the plurality of the end-user devices to fulfill the request; and
        an AI reporter to transmit information corresponding to the request and the response across the plurality of tenants of the cloud-based network.

2. The system of claim 1, wherein the request is first authenticated at a cloud proxy according to the plurality of policies and then forwarded to the AI engine.

3. The system of claim 1, wherein the AI engine protects the plurality of tenants within the cloud-based network against a malicious entity; and
    the user with the score that is crossing a threshold represents the malicious entity.

4. The system of claim 1, wherein the score is based on behavioral and historical analysis of the user allowing for pre-recognition of activities of a malicious entity.

5. The system of claim 1, wherein the AI engine moderates interactions by scaling up/down number of requests across the plurality of users and the plurality of services within the cloud-based network.

6. The system of claim 1, wherein the AI engine builds the context by determining how the user interacts with a service of the plurality of the services providing a subjective and an objective analysis.

7. The system of claim 1, wherein the AI engine while building the context:
    determines writing styles, writing tones, toxicity, sentiment, bias, banned topics, and subtopics used by the user in the request; and
    finds related events and components from a database within the cloud-based network.

8. The system of claim 1, wherein the plurality of functions manages the request by:
    enforcing rate limits and throttling to prevent abuse, overloading, and excessive costs;
    providing access control and authentication to allow access to the plurality of services to authorized users only;
    complying with data privacy regulations;
    supporting multiple languages to translate the request; and/or
    integrating with external services outside of the cloud-based network.

9. A method for generating a response using an artificial intelligence (AI) engine for a plurality of end-user devices using a plurality of services to provide threat protection in a cloud-based network, the method comprises:
    transmitting and segregating traffic within a plurality of tunnels between the plurality of end-user devices and the plurality of services;
    intercepting traffic within the plurality of tunnels at an application layer of the cloud-based network;
    receiving a request from a user of a plurality of users of an end-user device of the plurality of end-user devices;
    determining a context of the request, wherein the context is built by analyzing interactions of the plurality of users for similar requests;
    retrieving a score of the user for a likelihood that the request violates a policy of a plurality of policies;
    analyzing the request based on the score of the user and the context of the request;
    applying a plurality of functions to manage the request from the user;
    generating the response to the request based on the context and the score;
    sending the response to the user of the plurality of users of the end-user device to fulfill the request; and
    transmitting information corresponding to the request and the response to a plurality of tenants of the cloud-based network.

10. The method of claim 9, wherein the score is based on behavioral and historical analysis of the user allowing for pre-recognition of activities of a malicious entity.

11. The method of claim 9, wherein the AI engine moderates interactions by scaling up/down number of requests across the plurality of users and the plurality of services within the cloud-based network.

12. The method of claim 9, wherein the AI engine builds the context by determining how the user interacts with a service of the plurality of the services providing a subjective and an objective analysis.

13. The method of claim 9, wherein the building of the context within the AI engine further comprises:
    determining writing styles, writing tones, toxicity, sentiment, bias, banned topics, and subtopics used by the user in the request; and
    finding related events and components from a database within the cloud-based network.

14. The method of claim 9, wherein the plurality of functions manages the request by:
    enforcing rate limits and throttling to prevent abuse, overloading, and excessive costs;
    providing access control and authentication to allow access to the plurality of services to authorized users only;
    complying with data privacy regulations;
    supporting multiple languages to translate the request; and/or
    integrating with external services outside of the cloud-based network.

15. A non-transitory machine-readable media having machine-executable instructions embodied thereon that when executed by one or more processors, cause the one or more processors to perform a method for generating a response using an artificial intelligence (AI) engine for a plurality of end-user devices using a plurality of services for providing threat protection in a cloud-based network, the method comprising:

transmitting and segregating traffic within a plurality of tunnels between the plurality of end-user devices and the plurality of services;

intercepting traffic within the plurality of tunnels at an application layer of the cloud-based network;

receiving a request from a user of a plurality of users of an end-user device of the plurality of end-user devices;

determining a context of the request, wherein the context is built by analyzing interactions of the plurality of users for similar requests;

retrieving a score of the user for a likelihood that the request violates a policy of a plurality of policies;

analyzing the request based on the score of the user and the context of the request;

applying a plurality of functions to manage the request from the user;

generating the response to the request based on the context and the score;

sending the response to the user of the plurality of users of the end-user device to fulfill the request; and transmitting information corresponding to the request and the response to a plurality of tenants of the cloud-based network.

16. The non-transitory machine-readable media of claim 15, wherein the AI engine protects the plurality of tenants within the cloud-based network against a malicious entity; and the user with the score that is crossing a threshold represents the malicious entity.

17. The non-transitory machine-readable media of claim 15, wherein the score is based on behavioral and historical analysis of the user permits for pre-recognition of activities of a malicious entity.

18. The non-transitory machine-readable media of claim 15, wherein the AI engine moderates interactions by scaling up/down number of requests across the plurality of users and the plurality of services within the cloud-based network.

19. The non-transitory machine-readable media of claim 15, wherein the AI engine builds the context by determining how the user interacts with a service of the plurality of the services providing a subjective and an objective analysis.

20. The non-transitory machine-readable media of claim 15, wherein the plurality of functions manages the request by:

enforcing rate limits and throttling to prevent abuse, overloading, and excessive costs;

providing access control and authentication to allow access to the plurality of services to authorized users only;

complying with data privacy regulations;

supporting multiple languages to translate the request; and/or integrating with external services outside of the cloud-based network.

* * * * *